United States Patent [19]

Naraghi et al.

[11] Patent Number: 5,535,834
[45] Date of Patent: Jul. 16, 1996

[54] METHOD FOR REDUCING TORQUE IN DOWNHOLE DRILLING

[75] Inventors: Ali R. Naraghi, Missouri City; Robert S. Rozell, Nederland, both of Tex.

[73] Assignee: Champion Technologies, Inc., Fresno, Tex.

[21] Appl. No.: 300,308

[22] Filed: Sep. 2, 1994

[51] Int. Cl.$^6$ .......................... E21B 21/00; E21B 47/00; C09K 7/02
[52] U.S. Cl. .............. 175/40; 175/65; 507/133; 507/135; 507/136
[58] Field of Search ................................. 175/40, 61, 62, 175/65, 66; 166/301; 507/133, 135, 136, 940

[56] References Cited

U.S. PATENT DOCUMENTS

| | | | |
|---|---|---|---|
| 3,642,623 | 2/1972 | Bennett et al. | 175/65 X |
| 3,712,393 | 1/1973 | Sheldahl et al. | 507/135 X |
| 3,840,460 | 10/1974 | Sheldahl et al. | 175/65 X |
| 4,064,056 | 12/1977 | Walker et al. | 507/136 X |
| 4,496,012 | 1/1985 | Savins | 175/65 |
| 4,821,563 | 4/1989 | Maron | 175/40 X |
| 5,099,930 | 3/1992 | Enright et al. | 175/65 |

*Primary Examiner*—George A. Suchfield
*Attorney, Agent, or Firm*—Gunn & Associates

[57] ABSTRACT

The present invention relates to a method and a solution for use in downhole drilling to reduce the torque necessary to rotate the drill string. The solution comprises a sulfonate according to the formula $(RSO_3)_x Me^x$, where R is selected from the group consisting of an alkyl group, an aryl group, an alkylaryl group, and mixtures thereof having a molecular weight between about 280 and about 650, x is the number of $(RSO_3)$ groups, and $Me^x$ is a metal ion having a valence x. The solution is pumped down a drill string as a slug in order to coat solids which accumulate in the well and allow them to be removed along with the drilling fluid.

16 Claims, No Drawings

METHOD FOR REDUCING TORQUE IN DOWNHOLE DRILLING

FIELD OF THE INVENTION

The present invention relates to a method for reducing torque required in downhole drilling, and, more particularly, for the torque required in horizontal drilling. The present invention also relates to a torque reduction composition for use in horizontal drilling.

BACKGROUND OF THE INVENTION

Many wells are drilled vertically, such as the wells that are drilled in central Texas into a producing region known as the Austin chalk. The Austin chalk formation is a tight formation. Not only is the producing zone tight, it is relatively narrow, and is generally horizontal strata about 10 or 20 feet thick.

This narrow strata is penetrated by a well which is typically drilled through the strata and therebelow, and subsequently perforations in a casing string are formed opposite the producing formation. This causes production fluids to flow from the formation into the producing well.

Eventually, the rather thin, tightly defined formation will become depleted in that region. Ordinarily, that means that the well must be plugged and abandoned because it is no longer economically useful. As the well becomes depleted, one of the choices that might extend the life is a secondary completion procedure. Rather that simply abandon the well, the well is redrilled in a very special fashion. By backing up the well can be re-entered, and a window is then milled in the casing. The window cuts out about 100–300 feet of the casing. Through the use of a bent sub and a drill motor with a drill bit attached, the well is then continued by causing the drill bit to curve through the window cut in the casing and to drill to the side. The radius of curvature is controlled. Therefore the well which is typically vertical in the first instance will then be deviated.

The deviation can be controlled to the extent that the well then is directed horizontally. If the correct point of deviation is selected and if the curvature can be controlled properly, the horizontal well can then be located along the central portion of the strata which produces the desired petroleum products. Indeed, if the strata is at some canted angle with respect to the vertical well, the redrilled well can be directed in the middle of the strata for several hundred feet. It is possible to drill laterally from the vertical well borehole upwards of 1000 feet or so.

In horizontal drilling, the drill bit is advanced into the various formations encountered by the vertical well by grinding at the face of the advancing well borehole, forming chips or cuttings which are carried to the surface in the annular space on the exterior of the drill string. This carries the chips or cuttings to the surface where they are retrieved from the drilling fluid so that the drilling fluid is recycled to be used time and again. There is a substantial downward flow of drilling fluid directed to the drill string and hence there is a substantial return annular flow around the drill string. Even when the well is deviated significantly from the vertical, the foregoing remains true.

To be sure, it is somewhat idealized to represent the drill pipe as being centered within the annular hole. Sometimes, the drill pipe will contact the sidewall and will form what is known as a keyseat. Even in that instance, however, in vertical drilling there still remains a very substantial flow space which is normally concentric around the drill pipe but which may be distorted by keyseating.

As the well is deviated intentionally from a vertical hole toward a nearly horizontal hole, and particularly when drilling with a drill motor, a different type drill bit is used and a different source of power is applied. In that instance, the drill bit is normally rotated by a drill motor which is attached at a lower end of the drill string. Through the use of a bent sub, deviated drilling is controlled.

Furthermore, gravity causes the drill string behind the drill bit to lay against the bottom of the horizontal hole. This assures in all points and time that the return fluid flow including the chips or cuttings from the drilling process must flow above or around the drill pipe but not on all sides of it. So to speak, the drill pipe settles to the bottom of the hole. This creates a larger chance of sticking which is somewhat similar to keyseating with a vertical well. The chance of sticking is increased in proportion to the length of horizontal hole. For instance, if the horizontal portion of the well is only 200 feet, there is less chance of sticking than there would be if the horizontal portion of the hole were 1000 feet.

Generally, horizontal drilling is highly desirable, but is limited in part by the tendency to stick as the horizontal hole becomes longer and longer. Indeed, a horizontal well can substantially enhance production from a formation which is otherwise depleted. By contrast, this high production rate is achieved only when the horizontal hole is fairly long. As the horizontal portion is made longer sticking becomes a greater problem.

One aspect of sticking derives from embedding of the cuttings which are dislodged by operation of the motor and drill bit. The cuttings are flushed back towards the well head and forced to flow horizontally in the hole. The flow rate of the drilling fluid is normally sufficient to carry the cuttings. There is, however, some tendency of the cuttings to settle in this flowing drilling fluid and they tend to fall towards the bottom of the horizontal hole.

The bottom side of the horizontal hole is immediately adjacent to the curving drill string. If the drill string is resting against the bottom and the chips or cuttings fall toward the bottom there is the risk that the chips will be forced under the drill pipe and become embedded in the mudcake, perhaps embedding into the formation being drilled. If this occurs, an excessive number of chips or cuttings can be collected under the drill string and thereby create something of a chip buildup or accumulation on the bottom side of the well borehole.

Thus, a need exists for a composition and method for decreasing the buildup of cuttings in the annulus of a wellbore.

SUMMARY OF THE PRESENT DISCLOSURE

The present invention provides a liquid solution for reducing the torque required by a drilling rig to rotate a drill string when added to a drilling fluid. The solution comprises a sulfonate selected from the group consisting of alkyl sulfonates, aryl sulfonates, alkylaryl sulfonates, and mixtures thereof, wherein the sulfonates are defined according to the formula $(RSO_3)_x Me^x$; where R is an alkyl, aryl, or alkylaryl group, which may be either saturated or unsaturated and either linear or branched, having a molecular weight between about 280 and about 650, and $Me^x$ is a metal ion having a valence x; and a solvent having sufficient aromatic character to solvate sulfonates.

The invention also provides a method for reducing the torque necessary to rotate a drill string in a well, comprising the steps of pumping the solution down a drill stem along with the drilling mud and removing solids from the well along with the drilling mud. The solution may be pumped in a slug, in a multiple of slugs, or continuously.

DESCRIPTION OF THE PREFERRED EMBODIMENT

The inventors have found that a complex composition can be used to flush a hole free of cuttings. The inventors have also found that the composition can be applied in a single slug or pill which removes a substantial amount of cuttings.

The present invention relates to a method and solution for use in downhole drilling to reduce the torque necessary to rotate the drill string. This invention can provide many benefits to the exploration industry in horizontal drilling. Marginal successes and extreme costs with horizontal drilling have limited the number of attempted drilling projects in many areas. The present invention can overcome the many downhole problems encountered with drilling a horizontal lateral wellbore.

The present disclosure is directed to a torque reducing slug which is administered to the flow of drilling fluid injected into the well through the drill string from the mud pump on the surface. Typically, the dosage is delivered in one barrel doses or slugs. A slug of this material is administered to the well by injection into the mud flow stream from the surface. It is injected apt or downstream from the mud pump. The mud pump normally provides sufficient pressure to force the drilling fluid through the drill string. The slug of material in accordance with the present disclosure is delivered more or less as a single slug by flowing through the drill string from the surface to the well borehole at which juncture it is distributed in the annular space by flowing through the drill bit. When it flows through the drill bit, it is spread in the column of drilling fluid that fills the well borehole and is available for contact with the cuttings, the mudcake, and the supportive circular wall which is defined by the cylindrical borehole. Even where the borehole deviates from a perfect cylinder, the slug which is delivered by the present disclosure is effective. A single slug has been shown to experimentally reduce the drag encountered by the power system necessary for operation. Consider as an example one measure of drag which is indicated indirectly, but quite reliably, by the amount of electric power which is required to operate the drill motor. When that occurs, the drill motor can be operated with a marked reduction in current. While there are many types of drilling rigs, it is not uncommon, and it is probably prevelant, to use a diesel powered electric generator which provides current for operation of a motor which rotates to the rotary table. If a set of given conditions are achieved, thereby requiring a specified current flow for operation under those conditions, and a slug is administered to the well, the drop in current for operation at the same conditions is a very good indication that drag and torque requirements have been decreased. In that particular instance, the slug of the present invention has a direct quantitative impact on operation of the equipment. This certainly indicates that an advantage has been accomplished and that significant gains have been achieved in operation of the drilling system of the present disclosure.

The slug is a multi-component liquid product which can be used in either oil-based or water-based drilling fluids. The product is a solution comprising a surfactant and a solvent. The solution is pumped down a drill string as a slug in order to coat solids which accumulate in the well and allow them to be removed along with the drilling fluid. When the product comes into contact with the cuttings, the amount of solids removed to the surface in the drilling fluid is significantly increased. Solids are able to remain suspended in the drilling fluid due to the solids coating or wetting abilities of the product. Accordingly, the solids flocculate in increasingly larger quantities in proportion to the slug size. This flocculation gives the wellbore a cleaner annulus which reduces pipe drag, particularly in horizontal wellbores.

The solution of the present invention includes surfactants in a solvent. The surfactants are included in the solution in amounts between about 5 and about 35 weight percent. The preferred concentration of surfactant is from about 20 to about 35 weight percent. The surfactants of the present invention may be any surfactant which is miscible in the solvent selected including a sulfurized compound selected from sulfurized sperm oil, sulfurized lard oil, sulfurized fatty amides having equivalent weights greater than 500, sulfurized fatty acid, and mixtures thereof. These surfactants give drilling fluids excellent lubricity, anti-wear properties, and provide corrosion protection in drilling fluids. The process of sulfurizing is the saturation of a carbon-carbon double bond (—C=C—) with sulfur (—CS—CS—).

More particularly, the liquid solution is comprised of between about 5 and about 25 weight percent of a surfactant selected from the group consisting of alkyl sulfonates, aryl sulfonates, alkylaryl sulfonates, and mixtures thereof. These sulfonates are defined according to the formula $(RSO_3)_x Me^x$ where R is an alkyl, aryl, or alkylaryl group having a molecular weight between about 280 and about 650, and $Me^x$ is a metal ion having a valence x, preferably selected from the group consisting of potassium, magnesium, calcium, sodium, iron, and mixtures thereof. The valence, x, of the metal ion will dictate the number of sulfonate groups, x, which is generally a number between 1 and 4 but may be as high as 6. The liquid solution is miscible in oil and has a pH between about 4 and about 14.

Alkyl sulfonates are preferred, while petroleum sulfonates are most preferred. The addition of 0.2% of an oil soluble petroleum sulfonate, for example, reduces the surface tension of water from 76 dynes per cm to 42 dynes per cm. One half that amount (0.1%) of the same oil soluble petroleum sulfonate will reduce the interfacial tension between a petroleum oil and water from 51 dynes per cm to 2.1 dynes per cm. A prefered surfactant system is a mixture of sodium petroleum sulfonate, ethoxylated polymer acid, amine salts of alkyl naphthalene sulfonate, and ethoxylated fatty acid.

Another preferred surfactant system is a mixture of one or more alkyl sulfonates and one or more sulfurized compounds selected from the group consisting of sulfurized sperm oil, sulfurized lard oil, sulfurized fatty amides having equivalent weights greater than 500, sulfurized fatty acid, and mixtures thereof.

The solvent must have sufficient aromatic or polar character in order to solvate each component of the solution and is typically between about 20 and about 50 weight percent of a solvent selected from the group consisting of aromatic naptha, isopropyl alcohol, and mixtures thereof. The preferred solvent is a mixture of aromatic naphtha and isopropyl alcohol. The most preferred solvent includes about 30 weight percent aromatic naphtha and about 20 weight percent isopropy alcohol. Other solvents which are known to work in the solution of the present invention include methanol, ethylene glycol, mineral seal oil, and mixtures thereof.

In an alternative embodiment of the present invention, the liquid solution can further include certain carboxylic acids such as ethoxylated fatty acids, ethoxylated fatty alcohols, and ethoxylated fatty amines. More particularly, the preferred carboxylic acids of the present invention comprise between about 20 and about 30 weight percent of an ethoxylated fatty compound according to the formula $$R(X-(C_2H_4O)_n)_k$$

wherein R contains from about 12 to about 56 carbon atoms and is selected from the group consisting of a linear alkyl group, a branched alkyl group, and an alkylaryl group; wherein X is selected from the group consisting of a carboxyl group (—COO—), an oxygen atom (—O—), a secondary amine (—NH—), and mixtures thereof; and wherein n is a number from 1 to 20; and wherein k is a number from 1 to 3.

When preparing the solution, it is preferred that the components be mixed together in the following order: aromatic naphtha, isopropyl alcohol, polymer fatty acid, solvent, and surfactants.

The solution of the present invention is typically characterized by, but not limited to, the following physical properties.

| | |
|---|---|
| Specific gravity at 60° F. | 0.7–1.2 |
| Density at 60° F. | 5.8–10.0 lb/gal |
| Flash Point | 95° F. |
| Solubility | Oil |
| Pour Point | −35–+35° F. |
| Viscosity at 60° F. | 20 to 6000 centipoise |
| Appearance | Dark brown liquid with alcohol odor |

The present invention addresses many problems including rotary table torque, downhole solids removal, slow bit penetration, drill string pick-up weight, and drill pipe trip time. One common factor in each of these problems is solids removal. The troublesome solids are cuttings, created by the drilling action, which settled in the hole rather than being removed in the drilling fluid. Over time, the buildup causes additional friction on the pipe.

Drilling apparatus for creating a horizontal wellbore includes a drill string which extends downward through a vertical wellbore section and through a horizontal wellbore section. The above ground portion of the drill string is disconnectably coupled with the rotary table of a drilling rig. The terminal end of the drill string is connected to a mud motor and a drill bit.

As the drill bit progresses through the ground formation, it creates a wellbore having a diameter greater than that of the drill string. This creates an annular region around the drill string.

The normal mode of operation for the drilling apparatus requires that a drilling fluid (or mud) be pumped from a tank or pond by a mud pump down through the drill string. The pressurized mud travels down to the drill motor which uses the pressurized mud to produce a rotary motion on the drill bit. As the drill bit cuts through the formation, it produces granular cuttings or solids which are typically carried away by the drilling fluid flowing through the annulus. The returning drilling fluid or mud exits the top of the wellbore. The solids are then filtered out of the fluid by a filter or other device before being returned to the mud tank or pond.

While the foregoing description is the intended mode of operation, it is common that solids may fall out of the drilling fluid and settle in the wellbore hole. This is a particular problem in a horizontal wellbore section, where the solids accumulate on the bottom of the wellbore around the drill string which lays on the bottom surface. The accumulated solids can cover a large surface area of the drill string and cause great increases in the torque required by the rotary table to rotate the drill bit or to lift the drill string off the bottom of the well.

The drill string is rotated by the rotary table which is powered by an electric motor. A current generating source, typically a diesel engine, provides a direct current to the motor. The current required to operated the rotary table can be measured by an ammeter. Because the amount of torque required to rotate the drill bit is proportional to the current, the current reading from the ammeter is a convenient indicator of increasing or decreasing torque requirements.

The solution of the present invention reduces the torque requirements by increasing the solids removal from the annulus. Typically, a slug of the solution is pumped down the drill string. After exiting through the drill bit, the solution becomes dispersed in the drilling fluid and comes into intimate contact with the sides of the wellbore as well as the suspended solids and the surface of the accumulated solids.

The particulate coating abilities of the solution enables greater amounts of solids to remain in the fluid flow. In addition, the solution causes solids to flocculate in larger quantities as the concentration of the solution is increased. Flocculation keeps the annulus of the wellbore cleaner. This reduces pipe drag and strain on rotary equipment.

In field trials, the solution was shown to be most effective in 55 gallon pills or slugs. Where torque continues to be severe, the solution may be input into the pump suction at a rate of about ½ drum per hour. Maintaining a continuous feed of the solution prevents excessive buildup of solids and, therefore, helps maintain a lower torque between slugs. Although it may still be necessary to periodically add a slug to the well, the continuous feed will lengthen the interval between slugs. Average consumption for a 90 degree angle at approximately 12,500 feet to 13,500 feet is about 3 drums per 24 hours. This rate increases to about 4 drums per 24 hours as the horizontal leg lengthens to around 14,000 feet down.

It is typical that solids circulation to the surface stops once the drill string is lifted off the bottom of the well. As the drill string is lifted, solids will settle to the bottom. In many cases, when drill pipe is being tripped back to the bottom, the drill pipe must be screwed in order to reach the previous depth. However, when a single drum pill is circulated the length of the lateral wellbore prior to tripping the pipe off the bottom, the pickup weight is greatly reduced and the trip back to the bottom is dramatically faster.

The solution of the present invention can be successfully used in a wide variety of fluid types including fresh water, brine water, light and heavy clay muds, water containing calcium chloride, calcium bromide, and zinc bromide. The solution also works well where the fluid is a mixture of the fluid types just mentioned.

EXAMPLE 1

A solution was prepared having 32 weight percent aromatic naphtha, 23 weight percent isopropyl alcohol, 22 weight percent fatty polymer acid, 18 weight percent surfactant (8 wt. % sodium petroleum sulfonate, 4 wt. % ethoxylated polymer acid, 4 wt. % ethoxylated fatty acid, and 2 wt. % amine salt or alkyl naphthalene sulfonate), and 5 weight percent water.

A 55 gallon drum of the solution was injected into a wellbore as a slug. When the solution reached the bottom of the well the torque was reduced. In the table below, and also in all references t torque, the variable related to torque is the amount of current in amperes. Generally, the current is direct current because most drilling rigs use DC current. The following is a brief log of the results:

| Time | Activity | Rotary Torque (DC amperes) | Rate of Penetration (ft/hr) |
|------|----------|----------------------------|------------------------------|
| 1:00 | Pump one drum | 525 | 8 |
| 2:00 | Solution reaches bottom of well | 365 | 10 |
| 3:00 | continue drilling | 380 | 14 |
| 4:00 | continue drilling | 385 | 13 |
| 5:00 | continue drilling | 390 | 14 |
| 6:00 | continue drilling | 400 | 12 |
| 7:00 | continue drilling | 440 | 11 |

During the first hour after adding the one drum slug, the rotary torque dropped by 160 amperes and the rate of penetration increased. In addition, the pickup weight, defined as the amount of force required to get the bit off bottom, was decreased from 300,000 pounds to 240,000 pounds.

Another surprising result was that the time required to trip the pipe back to the bottom of the hole was greatly reduced from the typical range of 20 to 28 hours to about 12 hours. Solids removal and/or solids coating by the solution kept the wellbore clean, thereby allowing the drill pipe to slide and maintain a constant weight on the drill bit.

The coating action could be seen as the mud returned to the mud tanks from the bottom of the hole. The oil soluble solution coated the chalk drill cuttings and kept them in the return stream. This allowed the hole to be swept clean and reduced both torque and drag on the pipe.

EXAMPLE 2

A pipe string was in a rotary stall condition such that the rig could not move the pipe up, down, left, or right. Two pills or slugs were prepared by mixing one 55 gallon drum of the solution of Example 1 with 40–55 barrels of the drilling fluid. The pump strokes were lowered from 70–75 strokes per minute (spm) to about 40–50 spm to allow the sweep solution a longer contact time. The pipe was continually worked.

When the first slug reached bottom, the second slug was pumped downhole. As the second slug reached bottom, the pipe became unstuck and the rotary torque declined dramatically.

EXAMPLE 3

A drilling rig had completed a 93.1 degree angle section turn and continued drilling the lateral wellbore out to approximately 2,119 feet before encountering heavy drill pipe torque and pipe drag which jeopardized completion of the well. The total amount of drill pipe in the hole at that time was 13,419 feet with a total string weight of 235,000 pounds and a string pick-up weight of 310,000 pounds.

Fifty-five gallons of the solution of Example 1 were mixed with 50 barrels of 9.7 pound/gallon brine water which was available at the site. This pill was circulated to the bottom while the rig continued drilling. The pipe drag pick-up weight was reduced to approximately 240,000 pounds—a reduction of 70,000 pounds. In addition, the rotary torque dropped from 460 amperes to 375 amperes, a 17.5% reduction, in a matter of 37 minutes. The average rate of penetration experienced a 47% increase, starting at 15 feet per hour and rising to approximately 22 feet per hour (ft/hr).

Six hours after the pill addition, the rotary torque had increased slightly to 400 amperes and the rate of penetration had fallen to 18 ft/hr.

A little more than two days after the pill addition, the rotary torque has risen to 467 amperes. A second pill, identical to the first, was pumped down the hole. Fifty minutes later, the torque had dropped to 389 amperes and the rate of penetration increased from 14.6 ft/hr to 18.5 ft.hr.

Twenty-six hours after the second pill, with 403 amps torque and 15.7 ft/hr penetration, a third identical pill was pumped down the hole. Torque rapidly dropped to 325 amps and the penetration increased to 19.6 ft/hr.

It was three days following the third pill before the torque had increased to require 475 amps. The pipe string was now 14,387 feet long with a penetration rate of 12 ft/hr. Two highly concentrated pills were prepared by mixing 55 gallons of solution with only 20 barrels of brine water. One hour after the first pill was added, the torque was down to 420 amps and the penetration was 17 ft/hr. At that time, the second of the two concentrated pills was pumped downhole. One hour later, the torque was 375 amps and the penetration rate increased to 21 ft/hr.

After three additional days, a total of 10 days after the pipe first encountered heavy pipe torque and drag, the inclined lateral section of the well was completed with approximately 4,075 feet of upslope horizontal hole. This was accomplished with only 5 barrels (275 gallons) of the product solution.

While the foregoing is directed to the preferred embodiment of the present invention, other and further embodiments of the invention may be devised without departing from the basic scope thereof, and the scope thereof is determined by the claims which follow.

What is claimed is:

1. A method for reducing the torque necessary to rotate a drill string in a well, comprising the steps of:

(a) pumping a liquid solution down a drill stem along with the drilling mud;

the liquid solution consisting essentially of;

a sulfonate defined according to the formula $(RSO_3)_x Me^x$ where R is selected from the group consisting of an alkyl group, an aryl group, an alkylaryl group, and mixtures thereof, having a molecular weight between about 280 and about 650, x is the number of $(RSO_3)$ groups, and $Me^x$ is a metal ion having a valence x; and a solvent having sufficient aromatic character to solvate sulfonates; and (b) removing solids from the well along with the drilling mud.

2. The method of claim 1 wherein the sulfonates comprise between about 5 and about 35 weight percent of the liquid solution.

3. The method of claim 1 wherein the liquid is pumped down a drill stem as a slug.

4. The method of claim 1 wherein the liquid is pumped down a drill stem continuously over a period of time.

5. The method of claim 1 further comprising the steps of:

(c) rotating the drill string;

(d) measuring the amperage of the motor turning the drill string;

(e) repeating steps (a) through (d) until a reduction in the motor amperes is achieved.

6. The method of claim 1 wherein the liquid solution further consists essentially of an ethoxylated fatty compound according to the formula $$R(X-(C_2H_4O)_n)_k$$

wherein R contains from about 12 to about 56 carbon atoms and is selected from the group consisting of a linear alkyl group, a branched alkyl group, and an alkylaryl group; wherein X is selected from the group consisting of a carboxyl group (—COO—), an oxygen atom (—O—), a secondary amine (—NH—), and mixtures thereof; and wherein n is a number from 1 to 20; and wherein k is a number from 1 to 3.

7. The method of claim 6 wherein the ethoxylated fatty compound comprises between about 20 and about 30 weight percent of the liquid solution.

8. The method of claim 1 characterized in that the solution is miscible in oil and has a pH between about 4 and about 14.

9. The method of claim 8 wherein the solution is further characterized in that the solution has specific gravity at 60° F. between about 0.7 and about 1.2, viscosity at 60° F. between about 20 and about 6000 centipoise, pour point of between about −35° F. and about +35° F., and has a dark brown appearance with an alcohol odor.

10. The method of claim 1 further comprising the steps of:
   (c) rotating the drill string;
   (d) measuring the amperage of the motor turning the drill string;
   (e) filtering the solids out of the drilling mud;
   (f) recirculating the filtered drilling mud into the drill stem; and
   (g) repeating steps (a) through (f) to reduce rotary torque on the drill string as measured by motor amperes.

11. The method of claim 1 wherein the metal ion is selected from the group consisting of sodium, potassium, magnesium, calcium, iron, and mixtures thereof.

12. The method of claim 1 wherein the liquid solution further consists essentially of an amine salt of alkyl naphthalene sulfonate.

13. The method of claim 1 wherein the liquid solution further consists essentially of a sulfurized fatty amide.

14. A method for reducing the torque necessary to rotate a drill suing in a well, comprising the steps of:
   (a) pumping a liquid solution down a drill stem along with the drilling mud;
   wherein the liquid solution comprises;
      a sulfonate defined according to the formula $(RSO_3)_x Me^x$ where R is selected from the group consisting of an alkyl group, an aryl group, an alkylaryl group, and mixtures thereof, having a molecular weight between about 280 and about 650, x is the number of $(RSO_3)$ groups, and $Me^x$ is a metal ion having a valence x;
      a sulfurized fatty amide; and
      a solvent having sufficient aromatic character to solvate the sulfurized fatty amide; and
   (b) removing solids from the well along with the drilling mud.

15. A method for reducing the torque necessary to rotate a drill string in a well, comprising the steps of:
   (a) pumping a liquid solution down a drill stem along with the drilling mud;
   wherein the liquid solution comprises;
      a sulfonate defined according to the formula $(RSO_3)_x Me^x$ where R is selected from the group consisting of an alkyl group, an aryl group, an alkylaryl group, and mixtures thereof, having a molecular weight between about 280 and about 650, x is the number of $(RSO_3)$ groups, and $Me^x$ is a metal ion having a valence x;
      an ethoxylated fatty compound according to the formula $R(X-(C_2H_4O)_n)_k$ wherein R contains from about 12 to about 56 carbon atoms and is selected from the group consisting of a linear alkyl group, a branched alkyl group, and an alkylaryl group; wherein X is selected from the group consisting of a carboxyl group (—COO—), an oxygen atom (—O—), a secondary amine (—NH—), and mixtures thereof; and wherein n is a number from 1 to 20; and wherein k is a number from 1 to 3; and
      a solvent having sufficient aromatic character to solvate sulfonates; and
   (b) removing solids from the well along with the drilling mud.

16. The method of claim 15 wherein the liquid solution further consists essentially of a sulfurized fatty amide.

* * * * *